Sept. 25, 1962 R. M. WARNER, JR 3,056,100

TEMPERATURE COMPENSATED FIELD EFFECT RESISTOR

Filed Dec. 4, 1959

INVENTOR
R. M. WARNER, JR
BY
[signature]
ATTORNEY

United States Patent Office 3,056,100

Patented Sept. 25, 1962

3,056,100

TEMPERATURE COMPENSATED FIELD EFFECT RESISTOR

Raymond M. Warner, Jr., Scottsdale, Ariz., assignor to Bell Telephone Laboratories, Incorporated, New York, N.Y., a corporation of New York Filed Dec. 4, 1959, Ser. No. 857,314
4 Claims. (Cl. 338—25)

Figure 1:
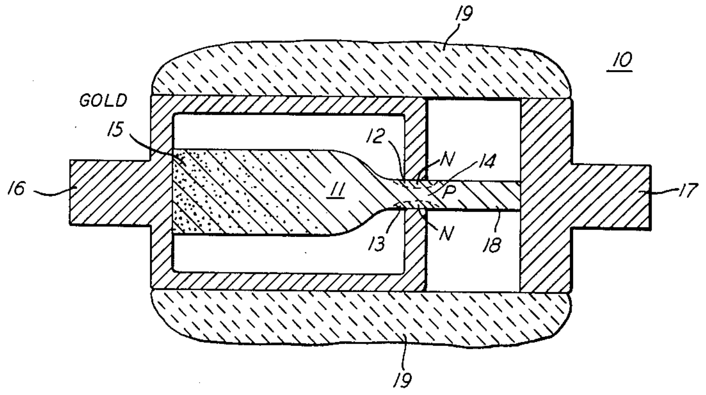

This invention relates to semiconductor devices and, more particularly, to semiconductor field effect resistors having a response which is substantially independent of changes in temperature.

The field effect resistor disclosed in the application of E. I. Doucette, H. A. Stone, Jr. and R. M. Warner, Jr., Serial No. 700,319, filed December 3, 1957, now Patent No. 2,954,486, has certain desirable output characteristics, including a current limiting feature, whose usefulness is lessened in certain applications by the temperature sensitivity of the device. This sensitivity usually takes the form of a negative temperature coefficient of the "pinch-off," or limiting current. This effect generally is attributed to the change in carrier mobility with changes in temperature.

Accordingly, a broad object of this invention is an improved field effect resistor.

A more specific object is a field effect resistor having a voltage-current characteristic which is substantially independent of changes in temperature.

In accordance with this invention, an integrated semiconductor structure, including a field effect resistor portion and a temperature compensating portion, provides a device in which changes in temperature effect current and voltage changes of opposite sign in the respective portions of the device.

More specifically, in one embodiment a temperature compensated field effect resistor comprises a body of silicon semiconductor material which includes an extended zone of P-type conductivity which forms the current channel of the body. This current channel is made up of two portions which have temperature coefficients of resistivity of opposite sign, a thermistor or temperature compensating portion and a current-limiting or pinch-off portion. Electrodes at the opposite ends of the current channel are termed the source and the drain. The pinch-off portion of the current channel includes a portion of reduced cross section defined between N-type conductivity gate zones on opposite sides of the channel. Gate electrodes are connected to the gate zones and the gate and source electrodes are interconnected to one terminal of the device and the drain electrode to the other terminal. The temperature-compensating portion of the current channel is positioned between the source electrode and the current-limiting portion. This thermistor portion, typically, may be produced by diffusing gold in specified concentration through this part of the body.

In the operation of the field effect resistor just described, the voltage drop through the gold-treated portion of the device between the source electrode and the gate zone defines the magnitude of voltage applied across the PN junctions adjacent to the gate zones. This voltage determines the extent of the depletion regions produced adjacent each junction which, in turn, defines the effective width of the pinch-off portion between the gate zones. As is known, the gold-treated portion of the silicon wafer may be fabricated so as to exhibit a negative coefficient of resistance. Thus, for a rise in temperature this negative coefficient defines a drop in resistance in the gold-treated portion and, consequently, a decrease in the IR drop which represents the bias voltage applied to the gate zone. This reduction in bias voltage reduces the extent of the depletion layers and compensates for the increase in the current-limiting channel resistivity occasioned by the given temperature rise.

Thus, a temperature compensated field effect resistor of this polar type includes a first portion of material having a temperature coefficient of resistivity opposite in effect to that of the coefficient of resistivity of the channel or pinch-off portion of the device. The impurity level of the compensating portion is chosen so that the change in self-bias is just sufficient to compensate for the change in channel resistivity for a given temperature change.

Thus, one feature of the temperature compensated field effect resistor is a semiconductor body including an integral portion which has a temperature coefficient of resistivity of opposite effect to that of the current-limiting portion. More specifically, a feature of the temperature compensated device of this invention is a portion having a gold or iron impurity distribution between the source electrode and pinch-off region.

In another embodiment of this device the temperature compensating portion may be produced by electron bombardment of that portion to produce the desired temperature coefficient characteristic.

Figure 2:
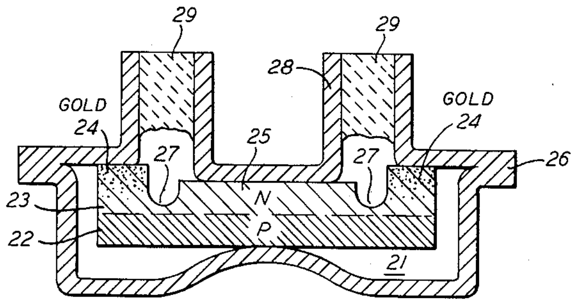
Figure 3:
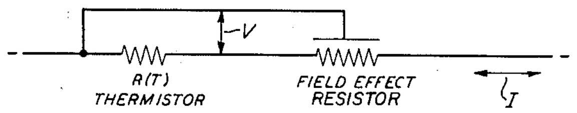

A better understanding of the invention and its other objects and features may be had from the following detailed description taken in connection with the drawing in which:

FIGS. 1 and 2 are schematic cross-sectional views of two embodiments of the temperature compensated field effect resistor; and FIG. 3 is an equivalent circuit diagram of the temperature compensated field effect resistor.

In FIG. 1, the encapsulated field effect resistor 10 comprises a filamentary body 11 of single crystal silicon having a first region of P-type conductivity. As shown, one end of the body is much larger in cross section than the other end. On opposite faces of the necked-down portion are N-type conductivity second regions 12 and 13, usually referred to as gate zones. As is disclosed in the above-mentioned application of Doucette-Stone-Warner, the N-type regions 12 and 13 extend across the width of the body 11 and define a current-limiting or pinch-off channel 14 therebetween. At the end 15 of the body 11 more remote from the channel portion 14, there is provided a concentration of uniformly dispersed gold atoms, represented by the stippled portion of the drawing. Typically, this larger temperature compensating portion of the body is about 0.040 inch square with a length of about 0.100 inch and the necked-down portion is about 0.010 inch square and of comparable length.

A metallic member 16 comprising a first terminal, which may be of Kovar—a well-known alloy of iron, nickel and molybdenum, is in low resistance contact with the gold-treated end 15 of the body and also with the N-type conductivity zones 12 and 13. A second metallic member 17, likewise of Kovar, is in low resistance contact with the opposite end 18 of the body. For ease of identification, the contact between member 16 and the gold-treated portion 15 of the first region is termed the first electrode. The contact between member 17 and the other end of the first region is the second electrode and the contact or contacts between member 16 and the second regions of opposite conductivity type are designated the third electrodes. Advantageously, the portions of the semiconductor body contacted by members 16 and 17 are plated with nickel to ensure a good low resistance contact. Surrounding and sealing the assembly is a glass casing 19.

The device of FIG. 1 is fabricated readily using conventional semiconductor fabrication techniques. A single crystal silicon body of P-type conductivity having a resistivity of about 20 ohm-centimeters is produced by well-known crystal forming methods. The body is necked down at one end by conventional masking and etching techniques which are well known. The N-type conductivity gate zones 12 and 13 are produced facilely by a solid state diffusion utilizing suitable masks and employing an N-type significant impurity, such as phosphorus, for a time and temperature sufficient to produce the desired penetration.

The gold dispersion in the temperature compensating portion 15 of the body 11 is provided by masking the necked-down portion and subjecting the body to a brief vapor diffusion treatment in an atmosphere containing gold. Alternatively, the thermistor portion of the wafer may be lightly coated with gold as from a gold cyanide solution and then heated for a brief period to introduce a uniform diffusion of gold atoms into adjacent portions of the wafer. Specific teachings of techniques for providing suitable gold dispersions are disclosed in the application of D. F. Ciccolella, J. H. Forster and R. L. Rulison, Serial No. 754,894, filed August 13, 1958. As a further alternative method, the entire body may be gold treated and the gold then removed from selected portions using the gettering techniques disclosed in G. Bemski Patent 2,827,436, issued March 18, 1958.

In the embodiment of FIG. 2, a field effect resistor of the polar type is provided which utilizes a trench arrangement to produce a pinch-off region. The wafer 21 compises a P-type conductivity gate zone 22 and an N-type current channel zone 23. For purposes of identification, N-type zone 23 is the first region and P-type zone 22 is the second region. The peripheral portion 24 of the zone 23 is raised above the central portion 25 and includes a dispersion of gold atoms to provide the desired temperature coefficient of resistivity necessary to produce the required temperature compensation. The source electrode comprises the metallic casing member 26 which may be of a resilient metal formed so as to contact the peripheral portion 24 of the N-type zone 23 to provide a first electrode to the first region and also to make low resistance contact to the P-type gate zone 22 which contact is denoted the third electrode. The pinch-off region is provided by the circular ditch 27 between the peripheral and central portions of the wafer. The drain electrode is a cuplike metallic member 28 making low resistance contact to the central portion 25 of the N-type zone 23 which is termed the second electrode to the first region. The final closure is provided by a glass seal 29 between the two metallic electrodes 26 and 28.

The following exposition constitutes one approach to an analysis of the temperature independent field effect resistor with particular reference to FIG. 3.

In the conventional field effect resistor in which the current-limiting feature is temperature sensitive, a change in temperature results in a change in current through the channel. It is assumed that there is substantially no change in gate bias voltage and therefore no change in the extent of the depletion layers. In order to provide a device which is temperature independent with respect to the limiting current, compensation is necessary to inhibit or prevent the change in current. This compensation may be effected by changing the extent of the depletion regions by changing the gate bias voltage. This desired change in gate bias voltage is denoted $dV_1$.

Further, the transconductance of the channel portion is denoted $g_m$, the temperature coefficient of current of the channel portion is $\beta$, and the temperature coefficient of resistivity of the compensating or thermistor portion is $\alpha$. Then, for a temperature T, by definition:

$$g_m=\frac{dI}{dV_1};\ dV_1=\frac{dI}{g_m} \qquad (1)$$

$$\beta=\frac{1}{I}\frac{dI}{dT} \qquad (2)$$

substituting $$dV_1=\frac{\beta I dT}{g_m} \qquad (3)$$

Now, looking more particularly at the thermistor portion of the device, the compensation or voltage change available may be denoted $dV_2$ and the following may be written:

$$dV_2=IdR+RdI$$

Because no change in current is assumed for a temperature independent device, then $$dI=0$$

and $$dV_2=IdR \qquad (4)$$

also, by definition $$\alpha=\frac{1}{R}\frac{dR}{dT} \qquad (5)$$

$$dR=\alpha R dT$$

and substituting in (4)

$$dV_2=I\alpha R dT \qquad (6)$$

Then, if the device is temperature independent, the bias voltage change available from the compensating portion must equal the gate bias voltage change desired and $$dV_1=dV_2$$

therefore from (3) and (6)

$$\frac{\beta I dT}{g_m}=I\alpha R dT$$

Dropping terms and rearranging $$\beta=\alpha R g_m \qquad (7)$$

In one specific example using the device of FIG. 1, in the gold-doped portion of the silicon body having an impurity concentration $$\frac{N_{gold}}{N_{acceptor}}=0.8\ (N_{acceptor}\sim 10^{15}\text{ per centimeter}^3)$$

$\rho\sim 20$ ohm-centimeter
$\alpha=-0.006$ per degrees centigrade
$\beta$ as measured in typical silicon field effect Resistors$=-0.003$ per degrees centigrade and $$g_m=10^{-3}\text{ mho}$$

substituting these values in Equation 7

$$R=500\text{ ohms}$$

This value of resistance in the thermistor portion of the field effect resistor is a typical value which provides the desired temperature compensation without appreciably degrading the overall characteristic of the device by deleteriously increasing the value of pinch-off voltage.

Thus, by a proper choice of P- and N-type impurity concentrations and the gold concentration, it is possible to vary $\alpha$ and $\rho$ independently for a given geometry and body dimensions. Generally, if higher values of $\alpha$ and $\rho$ are desired in the gold-treated portion of the body, the ratio of the length of that portion to its cross section must diminish and, thus, the limiting structure in this direction would comprise a thin gold-treated layer spread over a relatively large area.

Although the invention has been described in terms of preferred embodiments, it will be understood that variations may be devised by those skilled in the art which will be within the scope and spirit of the invention.

For example, although the foregoing disclosure relates to a polar type of current-limiting device, certain applications advantageously may use nonpolar current limiters. A nonpolar current-limiting two-terminal device may be constructed using two of the above-described polar elements connected in oppositely poled serial arrangement. In addition, this arrangement advantageously includes a pair of oppositely poled PN junction diodes connected in parallel with the current-limiting elements and having their interconnection point connected to the interconnection between the two current-limiting elements. As is known, the diodes in this configuration provide selectively shunting paths. It will be apparent that the desired polarity of the overall two-element device may be determined by a suitable arrangement of the polarities of the separate elements which comprise the overall device.

What is claimed is:

1. A temperature compensated two-terminal resistance element comprising a silicon semiconductor body, said body having a first region of one conductivity type and a second region of opposite conductivity type, said regions defining a PN junction therebetween, first and second low resistance electrodes contacting said body at spaced apart locations on said first region, a third low resistance electrode contacting said second region, a first terminal connected directly to said first and third electrodes and a second terminal connected to said second electrode, said first region including in the current path between said first and second electrodes a first portion of small cross section and a second portion of relatively larger cross section, the first portion having a temperature coefficient of resistivity opposite in sign to that of said second portion whereby temperature compensation is effected.

2. A temperature compensated two-terminal resistance element comprising a silicon semiconductor body, said body having a first region of one conductivity type and a second region of opposite conductivity type, said regions defining a PN junction therebetween, first and second low resistance electrodes contacting said body at spaced apart locations on said first region, said second region being intermediate said first and second electrodes, a third low resistance electrode contacting said second region, a first terminal connected directly to said first and third electrodes and a second terminal connected to said second electrode, said first region including in the current path between said first and second electrodes a first portion of small cross section and a second portion of relatively larger cross section, the first portion having a temperature coefficient of resistivity opposite in sign to that of said second portion whereby temperature compensation is effected.

3. A temperature compensated two-terminal resistance element in accordance with claim 2 in which said second portion includes a dispersion of gold atoms in a concentration sufficient to provide the temperature coefficient of resistivity opposite in sign to that of the first portion.

4. A temperature compensated two-terminal resistance element comprising a silicon semiconductor body having a channel region of one conductivity type and a pair of gate regions of opposite conductivity type, a source and a drain electrode contacting said body at respective spaced apart locations of said channel region, a pair of gate electrodes each contacting one of said gate regions and located in opposed relation intermediate said source and drain electrodes thereby producing in said channel region a restricted portion of reduced cross section adjacent to said gate regions, and a compensated portion between said restricted portion and said source electrode, said compensated portion having a temperature coefficient of resistivity opposite in sign to that of said channel portion.

References Cited in the file of this patent

UNITED STATES PATENTS

| | | |
|---|---|---|
| 2,597,028 | Pfann | May 20, 1952 |
| 2,701,326 | Pfann | Feb. 1, 1955 |
| 2,754,431 | Johnson | July 10, 1956 |
| 2,845,373 | Nelson | July 29, 1958 |
| 2,860,219 | Taft et al. | Nov. 11, 1958 |
| 2,871,377 | Tyler et al. | Jan. 27, 1959 |